(12) United States Patent  (10) Patent No.: US 8,069,221 B2
Ivanova et al.  (45) Date of Patent: Nov. 29, 2011

(54) STARTING ENTERPRISE APPLICATIONS ON DEMAND

(75) Inventors: Viktoriya T. Ivanova, Sofia (BG); Krasimir I. Topchiyski, Sofia (BG); Vladimir K. Pavlov, Sofia (BG)

(73) Assignee: SAP AG, Walldorf (DE)

( * ) Notice: Subject to any disclaimer, the term of this patent is extended or adjusted under 35 U.S.C. 154(b) by 990 days.

(21) Appl. No.: 12/013,651

(22) Filed: Jan. 14, 2008

(65) Prior Publication Data

US 2009/0182838 A1 Jul. 16, 2009

Related U.S. Application Data

(60) Provisional application No. 60/926,989, filed on Apr. 30, 2007.

(51) Int. Cl.
*G06F 15/16* (2006.01)
(52) U.S. Cl. ........................................................ 709/217
(58) Field of Classification Search ................. 709/217; 717/120, 104
See application file for complete search history.

(56) References Cited

U.S. PATENT DOCUMENTS

2005/0108702 A1* 5/2005 Baker et al. .................. 717/168
* cited by examiner

*Primary Examiner* — Joseph Avellino
*Assistant Examiner* — Marshall McLeod

(57) ABSTRACT

A method to start enterprise applications on demand using naming references is described. The method matches Enterprise JavaBeans applications to respective naming references, checks if the matched application is running and starts it if it is not.

15 Claims, 4 Drawing Sheets

STARTING ENTERPRISE APPLICATIONS ON DEMAND

This application claims priority of U.S. Provisional Patent Application No. 60/926,989, entitled "Web Container et al.", filed Apr. 30, 2007.

FIELD OF INVENTION

The invention relates generally to enterprise applications, and, more specifically, to starting enterprise applications on demand.

BACKGROUND

Application servers are platforms that host and provide services to applications. Application servers manage the life cycles of applications and take care that the logic implemented in applications is accessible to clients in a centralized fashion. Applications running on a server consume a multitude of resources. These include, but are not limited to, main memory resources, central processing unit (hereinafter "CPU") resources, database connections, and so on. These resources are critical for the performance of the application server. Consequently, the higher the number of running applications on a server, the higher load the application server has to processes with less resources. Usually business scenarios involve complex information technology landscapes with thousands of applications deployed on an application server. However, at any given time, only a small subset of these applications is used. Thus, if the application server can start only the applications that are needed at a given point of time, it will be able to optimize the use of resources and distribute them as they are needed.

To access an application on a Java application server, a client obtains the application by performing a lookup operation via the Java Naming and Directory Interface (hereinafter "JNDI"). However, applications are bound to the JNDI on application startup. Thus, if an application is not running, a client will not be able to look it up. This implies that at any given time all applications must be running so that in the event a client wants to use them, the client will be able to look them up. Running thousands of applications on a server can result in system downtime due to the lack of critical system resources.

SUMMARY

The invention describes a method and system to load enterprise applications on demand in response to client requests.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Descriptions of certain details and implementations follow, including a description of the figures, which may depict some or all of the embodiments described below, as well as discussing other potential embodiments or implementations of the inventive concepts described herein.

Java application servers run Java applications deployed on them. Such applications may be Enterprise JavaBeans (hereinafter "EJB") applications, web applications, web services applications, and so on. From a client point of view, each EJB application has a single point of entry—the Java Naming and Directory Interface (hereinafter "JNDI"). All running EJB applications place objects in the JNDI registry. When a client requests an EJB application, it performs a lookup operation to find the application's object in the JNDI. For these objects to be available in the JNDI, the application must be running as objects are bound in the registry on application startup. In order to maintain the number of running applications to a minimum, an embodiment of the invention creates naming references that are placed in the JNDI and associated with an object factory that has the responsibility to resolve the reference. Naming references contain metadata identifying a particular application and as such do not require the application to be running. An object factory associated with the naming reference identifies the application using the metadata and checks if the application is running. If the application is running, it obtains an instance of the application and returns it to the client. If the application is not running, the object factory starts the application and returns the instance to the client. Thus, only the applications that are requested by a client are started and only the minimum set of system resources is consumed at any given time.

Figure 1:
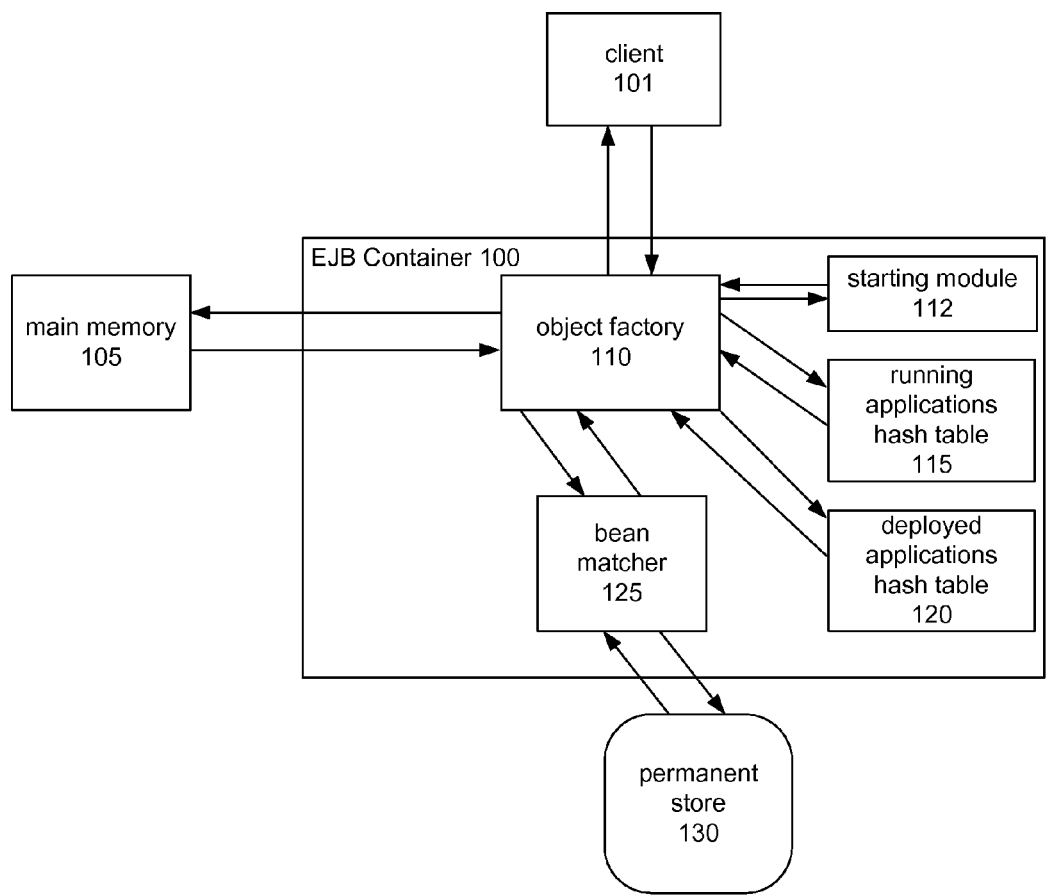
FIG. 1 is a bock diagram of a system of an embodiment of the invention for starting enterprise applications on demand.

FIG. 1 is a bock diagram of a system of an embodiment of the invention for starting enterprise applications on demand. Referring to FIG. 1, an EJB container 100 enables loading applications deployed on the application server on demand using a number of components. A client 101 requests an application. The request is received by an object factory 110. The object factory 110 extracts metadata from a naming reference and sends the data to a bean matcher 125. The bean matcher 125 identifies the application corresponding to metadata extracted from a naming reference identifying the application. The object factory 110 proceeds to read the running applications hash table 115 and the deployed applications hash table 120. The running applications hash table 115 contains a list of all started applications. It is updated every time an application is started or stopped. When an application is started it is entered in the running applications hash table 115. When an application is stopped its entry is removed from the running applications hash table 115. The deployed applications hash table 120 contains a list of all applications deployed on the application server. Once an application is deployed it is entered in the deployed applications hash table 120. The deployed applications hash table 120 is also updated when an application is removed from the server, that is, when an application is 'undeployed'. Thus, the running applications hash table 115 together with the deployed applications hash table 120 maintain a current list of applications at all times. If the object factory 110 locates the identified application in the running applications hash table 115, the object factory 110 returns a reference to it to the client 101. If the object factory 110 locates the identified application in the deployed applications hash table 120, the object factory 110 initiates the starting module 112 to start the application. The starting module 112 starts the application. The application is recorded in the running applications hash table 115 and the object factory 110 returns a reference to the application to the client 101. All applications deployed on the server are initially deployed and maintained in a stopped state. They are physically available on a permanent store 130. Only when an application is requested from a client such as the client 101, the application will be started and loaded in main memory 105. It is at that time that the application starts consuming critical system resources such as Central Processing Unit (CPU) time, main memory, and database connections. By keeping all applications in a stopped state prior to actual requests for them, the EJB container 100 is able to efficiently manage the resources available to it. For example, with less resource consumption, the EJB container 100 can service client requests to running applications faster. Also, as the container 100 dynamically monitors running applications as opposed to deployed applications using the hash tables 115 and 120, the EJB container 100 can distribute the resources available to it among the running applications more efficiently. As the running applications hash table 115 grows, the container 100 can request the allocation of more resources form the application server.

From a broader perspective of an application server, an EJB container is one of many containers. As such, improving the resource consumption of one container automatically makes more resources available to the other containers and thus improves overall system performance. The approach for loading applications on demand as described herein is not limited to EJB applications only and can be applied to any application on a Java application server. If all containers load applications on demand, system performance can be dramatically improved.

Figure 2:
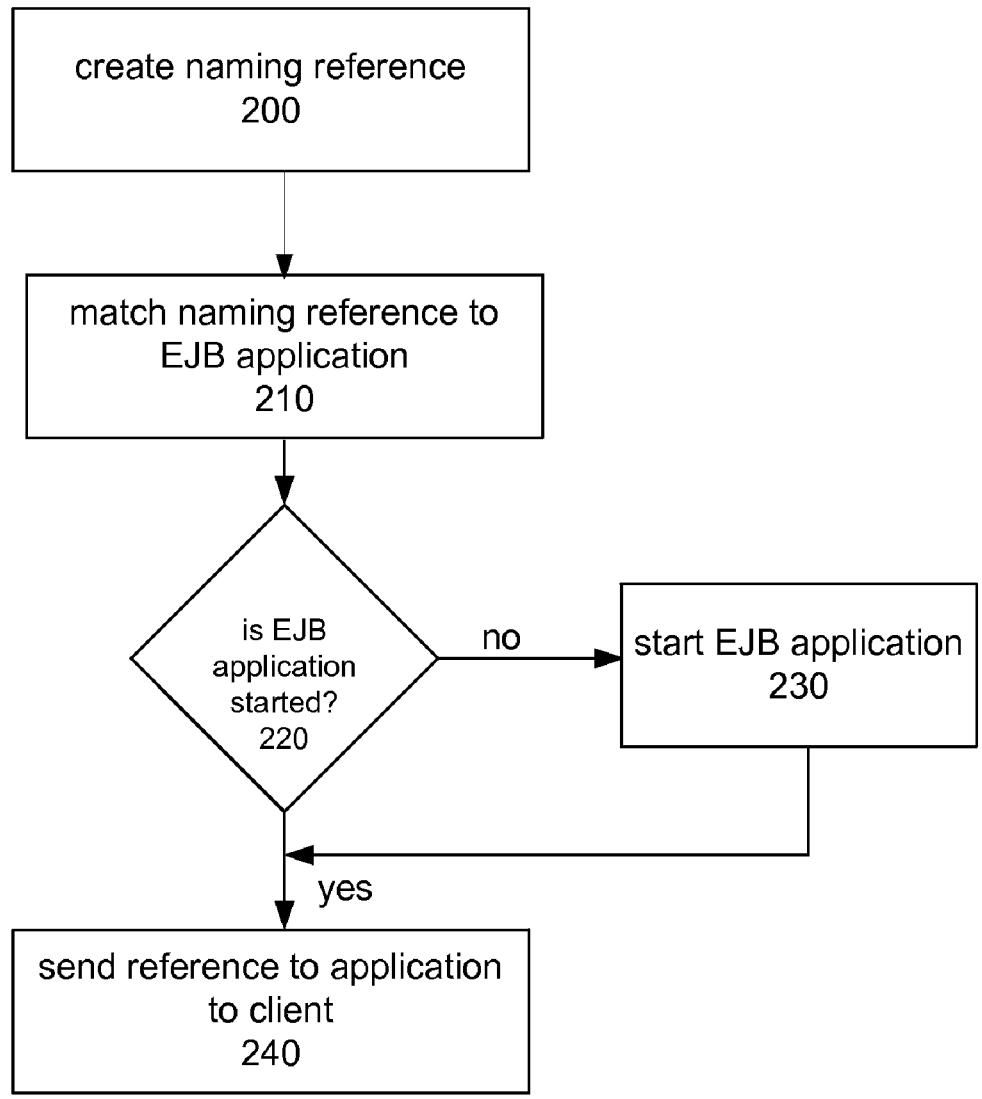
FIG. 2 is a flow diagram of an embodiment of the invention for starting enterprise applications on demand.

FIG. 2 is a flow diagram of an embodiment of the invention for starting enterprise applications on demand. Referring to FIG. 2, at processing block 200, a naming reference is created for each EJB application deployed on the server. At processing block 210, the naming reference is matched to an EJB application. At processing block 220, the system checks if the application is started. At processing block 230 the system starts the application. The system returns a reference to the application to the client at processing block 240. If at processing block 220 the application is started, the system proceeds to return a reference to the application to the client at processing block 240. With the introduction of a naming reference for each application, all applications deployed on the server are initially in a stopped state. Applications are only started of there is a request for them from a client.

In one embodiment of the invention, the method as described in FIG. 2 is performed by the components as described in FIG. 1. The EJB container 100 creates a naming reference for an EJB application at processing block 200. At processing block 210, the EJB container 100 receives a request for an application from a client 101. Further, at processing block 210, the object factory 110 initiates the bean matcher 125 to match the naming reference to an EJB application. At processing block 220 the object factory 110 checks if the application identified to match the naming reference by the bean matcher 125 is started. If at processing block 220 the object factory does not identify the application as a started one, the object factory initiates the starting module 112 at processing block 230. At processing block 230 the starting module 112 starts the application and passes control to the object factory 110. The object factory 110 sends a reference to the application to the client 101 at processing block 240. If at processing block 220 the application is identified as a started one, the object factory send a reference to the application to the client 101 at processing block 240.

Figure 3:
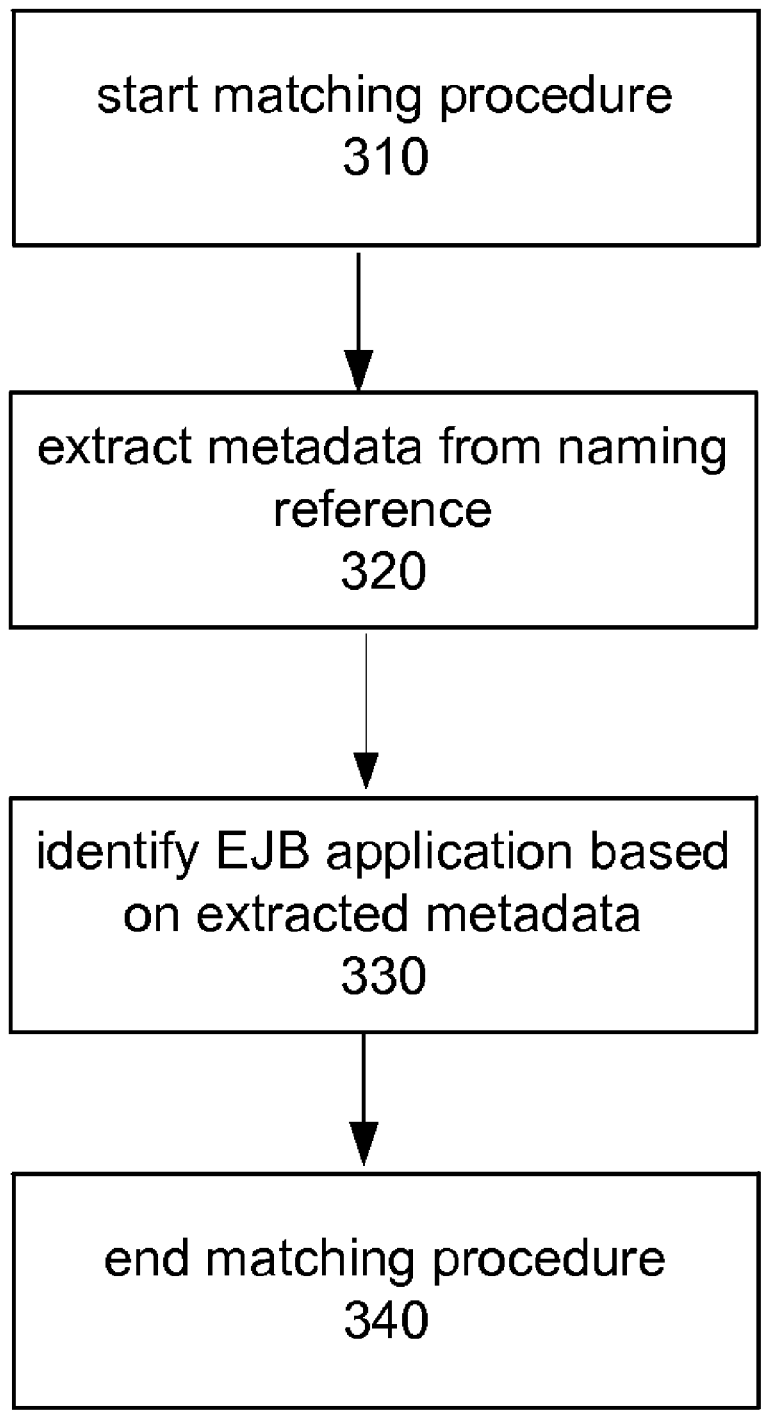
FIG. 3 is a flow diagram of an embodiment of the invention for matching an enterprise application to a naming reference.

FIG. 3 is a flow diagram of an embodiment of the invention for matching an enterprise application to a naming reference. To return a reference to the correct application corresponding to the naming reference, the system executes a matching procedure as described in FIG. 3. At processing block 310, the system starts the matching procedure. At processing block 320, metadata is extracted from the naming reference. The metadata in the reference represents information needed to identify the application such as the application name, and the names of the application modules included in the application. At processing block 330 the system identifies an EJB application that matches the extracted metadata. At processing block 340 the system completes the matching procedure. At this point the system knows which application has been requested by the client.

In one embodiment of the invention, the method as described in FIG. 3 is performed by components as described in FIG. 1. At processing block 310, the object factory 110 initiates a matching procedure by passing the naming reference to the bean matcher 125. The bean matcher 125 extracts metadata from the naming reference at processing block 320. At processing block 330, the bean matcher 125 identifies an EJB application corresponding to the naming reference by comparing the metadata extracted from the reference to information maintained in a permanent store 130. The bean matcher 125 returns information about the identified EJB application to the object factory 110 and ends the matching procedure at processing block 340.

Figure 4:
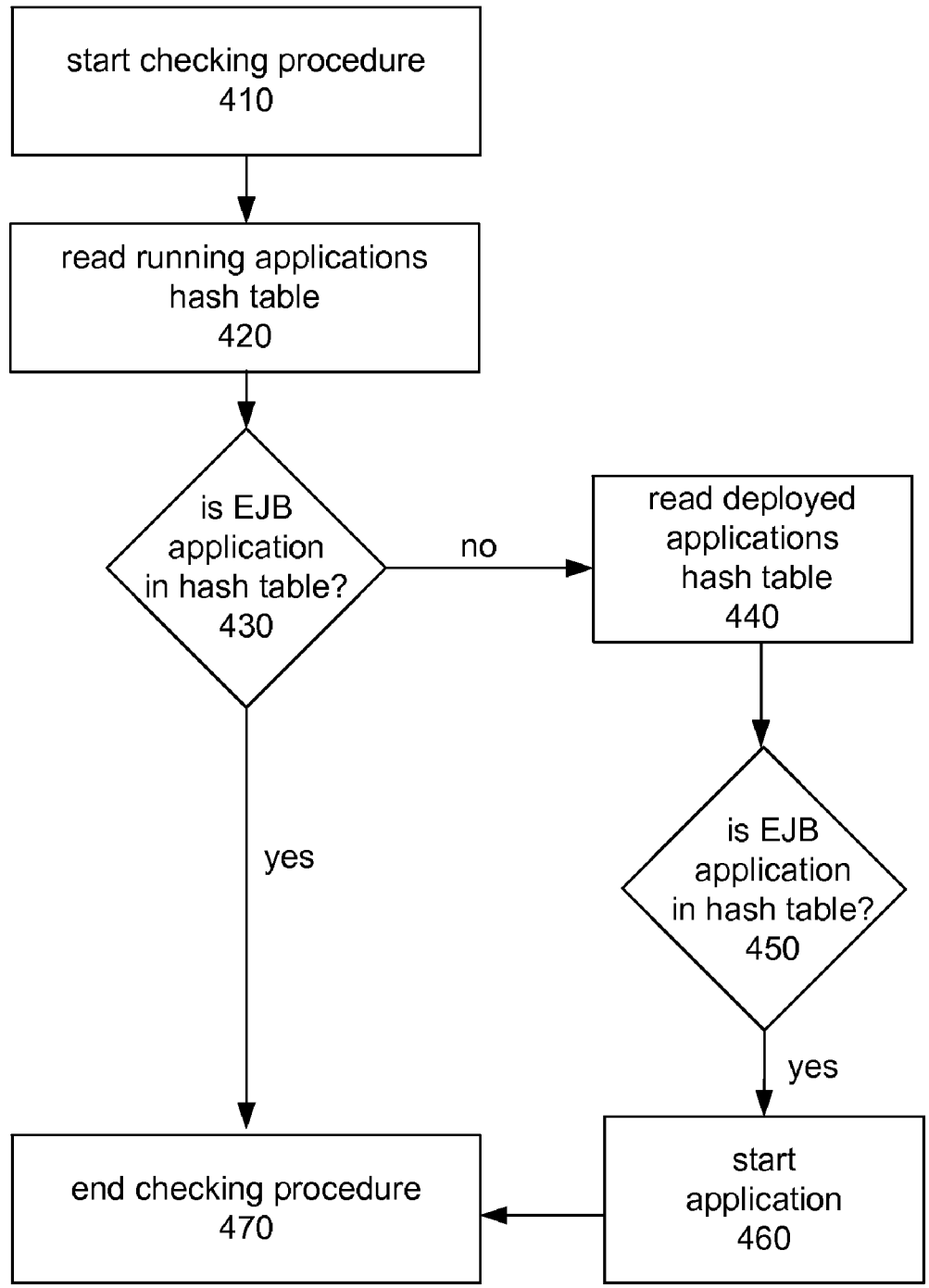
FIG. 4 is a flow diagram of an embodiment of the invention for checking if an enterprise application is started.

For the client to use the business logic available in the application, the application must be running. The system initiates a checking procedure to check if the application is started. FIG. 4 is a flow diagram of an embodiment of the invention for checking if an enterprise application is started. Referring to FIG. 4, at processing block 410 the checking procedure starts. At processing block 420 the running applications hash table is read. The running applications hash table contains entries for all running applications. If at processing block 430 the application is not found in the running applications hash table, the system proceeds to processing block 440. At processing block 440 the system reads a deployed applications hash table. If at processing block 450 the application is found in the deployed applications hash table, the system starts the application at processing block 460. The system ends the checking procedure at processing block 470. If at processing block 430 the application is found in the running applications hash table, the system ends the checking procedure at processing block 470.

In one embodiment of the invention, the method as described in FIG. 4 is performed by components as described in FIG. 1. The object factory 110 initiates the checking procedure at processing block 410. The object factory 110 reads the running applications hash table 115 at processing block 410 to estimate if the application is running. If at processing block 430 the object factory 110 identifies the application as a running application, the object factory 110 ends the checking procedure at processing block 470. If at processing block 430 the object factory 110 does not find the application in the running applications hash table 115, the object factory proceeds to read the deployed applications hash table 120 at processing block 440. If at processing block 450 the object factory 110 identifies the application in the deployed applications hash table 120, the object factory 110 initiates the starting module 112 at processing block 460. The starting module 112 starts the application at processing block 460. The object factory 110 ends the checking procedure at processing block 470, loads the application in main memory 105, and returns a reference to the application to the client 101.

Elements of embodiments may also be provided as a machine-readable medium for storing the machine-executable instructions. The machine-readable medium is an article of manufacture and may include, but is not limited to, flash memory, optical disks, CD-ROMs, DVD ROMs, RAMs, EPROMs, EEPROMs, magnetic or optical cards, or any other type of machine-readable media suitable for tangibly storing electronic instructions. For example, embodiments of the invention may be downloaded as a computer program which may be transferred from a remote computer (e.g., a server) to a requesting computer (e.g., a client) via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A computer implemented method for on demand starting of an application comprising:
    creating a naming reference within a memory storage, the naming reference comprising metadata describing an Enterprise JavaBean (EJB) application;
    matching the EJB application to the naming reference within the memory storage responsive to a request for the EJB application from a client, the naming reference obtained by an object factory;
    persisting a running applications hash table to maintain a list of started EJB applications;
    persisting a deployed applications hash table to maintain a list of deployed EJB applications;
    checking via the naming reference if the EJB application is in the running applications hash table;
    starting the application if the EJB application matched to the naming reference is only found in the deployed applications hash table;
    returning a reference to the EJB application to the client if the EJB application is in the running applications hash table.

2. The method of claim 1, wherein the naming reference is created at application deploy time.

3. The method of claim 1, wherein creating the naming reference comprises recording information identifying the EJB application and storing the information in a permanent store.

4. The method of claim 1, wherein matching the EJB application to the naming reference comprises extracting metadata from the naming reference and identifying the EJB application against the extracted metadata.

5. The method of claim 1, wherein checking via the naming reference if the EJB application is in the running applications hash table comprises:
    reading the running applications hash table comprising a list of EJB applications started on an application server; and
    identifying the application in the running applications hash table using application identification information from the naming reference.

6. The method of claim 5, further comprising:
    reading the deployed applications hash table comprising a list of EJB applications deployed on an application server if the application is not present in the running applications hash table;
    identifying the application in the deployed applications hash table; and
    sending a request to start the application.

7. A system comprising:
    a client module to request an Enterprise JavaBeans (EJB) application;
    a permanent store to maintain the EJB application;
    a main memory module to maintain a naming reference identifying the EJB application;
    a bean matcher to match the naming reference to the EJB application in the permanent store;
    an object factory to obtain the naming reference from the main memory and invoke the bean matcher responsive to the request for the EJB application from the client;
    a running applications hash table to maintain a list of EJB applications started on an application server;
    a deployed applications hash table to maintain a list of EJB applications deployed on the application server; and
    a starting module to start the EJB application matched to the reference if the EJB application is only found in the deployed applications hash table.

8. The system of claim 7, wherein the naming reference comprises:
    a component to hold information about the identity of the EJB application; and
    a component to hold naming objects.

9. The system of claim 7, wherein the running applications hash table comprises metadata objects identifying started EJB applications.

10. The system of claim 7, wherein the deployed applications hash table comprises names of deployed applications.

11. A non-transitory machine readable medium having instructions therein that when executed by the machine, cause the machine to:
    create a naming reference within a memory storage, the naming reference comprising metadata describing an Enterprise JavaBean (EJB) application;
    match the EJB application to the naming reference within the memory storage responsive to a request for the EJB application from a client, the naming reference obtained by an object factory;
    persist a running applications hash table to maintain a list of started EJB applications;
    persist a deployed applications hash table to maintain a list of deployed EJB applications;
    check via the naming reference if the EJB application is in the running applications hash table;
    start the application if the EJB application matched to the naming reference is only found in the deployed applications hash table; and
    return a reference to the EJB application to the client if the EJB application is in the running applications hash table.

12. The machine readable medium of claim 11, wherein instructions causing the machine to create the naming reference, cause the machine to record information identifying the EJB application and store the information in a permanent store.

13. The machine readable medium of claim 11, wherein instructions causing the machine to match the EJB application to the naming reference, cause the machine to:
- extract metadata from the naming reference; and
- identify the EJB application against the extracted metadata.

14. The machine readable medium of claim 11, wherein instructions causing the machine to check via the naming reference if the EJB application is in the running applications hash table, cause the machine to:
- read the running applications hash table comprising a list of EJB applications started on an application server; and
- identify the application in the running applications hash table using application identification information from the naming reference.

15. The machine readable medium of claim 14, further comprising instructions that cause the machine to:
- read the deployed applications hash table comprising a list of EJB applications deployed on an application server if the application is not present in the running applications hash table;
- identify the application in the deployed applications hash table; and
- send a request to start the application.

* * * * *